Nov. 4, 1969 TAKAAKI KATO 3,476,205
AUTOMATIC CONSTANT SPEED MAINTAINING MEANS FOR AN AUTOMOBILE
Filed Feb. 20, 1967 4 Sheets-Sheet 1

INVENTOR.
TAKAAKI KATO
BY
Linton and Linton
ATTORNEYS

United States Patent Office
3,476,205
Patented Nov. 4, 1969

3,476,205
AUTOMATIC CONSTANT SPEED MAINTAINING MEANS FOR AN AUTOMOBILE
Takaaki Kato, Toyohashi-shi, Japan, assignor to Nippon Denso Kabushiki Kaisha, Kariya-shi, Japan
Filed Feb. 20, 1967, Ser. No. 617,203
Int. Cl. B60k 27/00, 33/00; F02d 11/10
U.S. Cl. 180—105    2 Claims

ABSTRACT OF THE DISCLOSURE

The automatic constant speed maintaining means for an automobile in accordance with this invention is characterized by a negative feed back arrangement from a potentiometer to the input side of a relay circuit whereby the means is kept in operation by the action of itself while tending to keep the running speed of the automobile at a predetermined value. The means may be further characterized by a rotation detecting generator whereby the closure and the opening of the throttle valve occur at the same speed with each other.

BACKGROUND OF THE INVENTION

Field of the invention

The field to which this invention belongs, is the speed control system for an automobile.

Description of the prior art

Heretofore, in order to run an automobile keeping a constant speed, it is necessary for the driver to continuously depress the accelerator pedal correspondingly to continuous variation in load which varies continuously correspondingly to continuous variation in status of the road, so that, when a long way is to be run, it is inevitable that the driver is appreciably physically and mentally fatigued. In order to solve this problem, some automatic constant speed maintaining means have been proposed. In general, these means comprise a motor for controlling the speed of the automobile, which opens and closes a throttle valve of the carburator whereby the variation in speed of the running automobile is kept within a range around a set speed. The throttle valve and the accelerator pedal of the automobile are spring-loaded so that, when the throttle valve is opened, the more opened the valve is, the larger the required force is and, when the valve is closed, the more closed the valve is, the less the load becomes. Therefore, the load delivered to the motor always varies correspondingly to the opening of the throttle valve and it is impossible to keep the load constant. Thus when the throttle valve is controlled by the motor, the driving speed of the motor which is desired gain from the standpoint of the control, varies inevitably incessantly, so that it is difficult to obtain a favourable damping characteristic of the throttle valve, resulting in disadvantageously deteriorate the sensation given by the running automobile while a constant speed is maintained. Such is the defect in the prior art.

SUMMARY OF THE INVENTION

The automatic constant speed maintaining means for an automobile in accordance with this present invention is characterized by the provision of a running speed detecting means which generates a voltage proportional to the speed at which the automobile is running, a relay circuit which acts either positively or negatively depending upon a difference of the voltage from a predetermined value set in a speed setting means, a servo mechanism which is either positively or negatively rotated depending upon the plus or minus or the relay circuit so as to open or close the throttle valve of the automobile, and a potentiometer from which another voltage is negatively fed back to the input side of the relay circuit, the last-named voltage corresponding to the opening of the throttle valve, whereby the automatic constant speed maintaining means is kept in operation by the action of itself, tending to keep the running speed of the automobile at the predetermined set value. By virtue of this present invention, it is possible to maintain the running speed of the automobile at the predetermined constant value without any manual operation while making the damping characteristics of the control system favorable.

The automatic constant speed maintaining means for the automobile in accordance with this present invention may be further characterized by the provision of a rotation detecting generator which detects the rotation of a motor or an armature of the servo mechanism and generates still another voltage which operates a transistor which drives a relay inserted in the power circuit of the armature, whereby the power circuit is broken when the rotation is increased up to a predetermined value, so that the rotation is maintained around the predetermined value regardless of the variation in load delivered to the armature or motor. By virtue of this arrangement, the throttle valve is driven smoothly, ending in obtaining favorable damping characteristic so as to make the driver comfortable while running at a constant speed.

Brief description of the drawing

The invention will be better understood and other objects and additional advantages of the invention will become apparent upon perusal of the description of the preferred embodiments set forth hereinafter referring to the drawings, in which.

Description of the preferred embodiments

Figure 1:
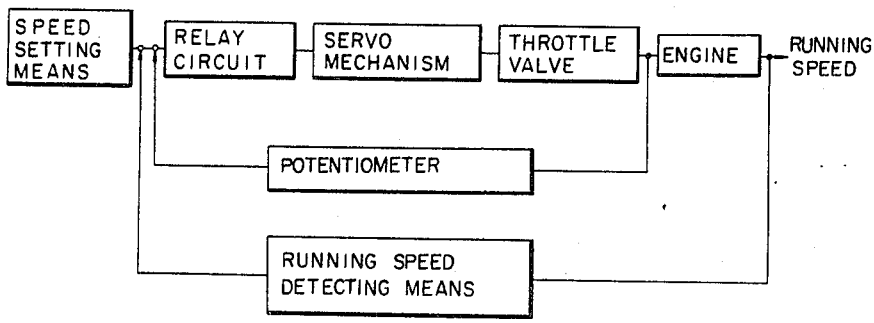
FIG. 1 is a block diagram of an automatic constant speed maintaining means for an automobile, embodying this present invention.
Figure 2:
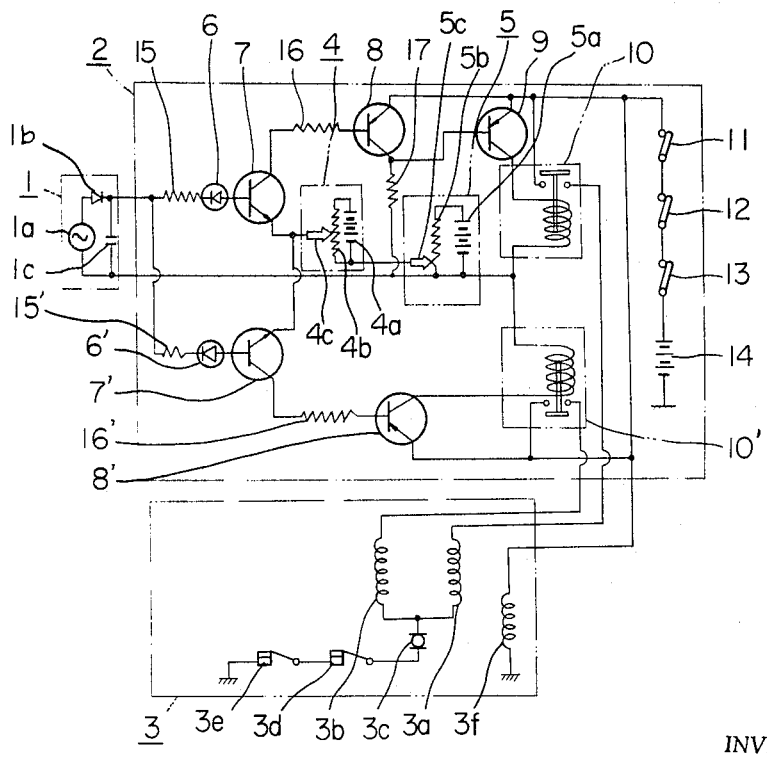
FIG. 2 is an electrical connection diagram thereof.
Figure 3:
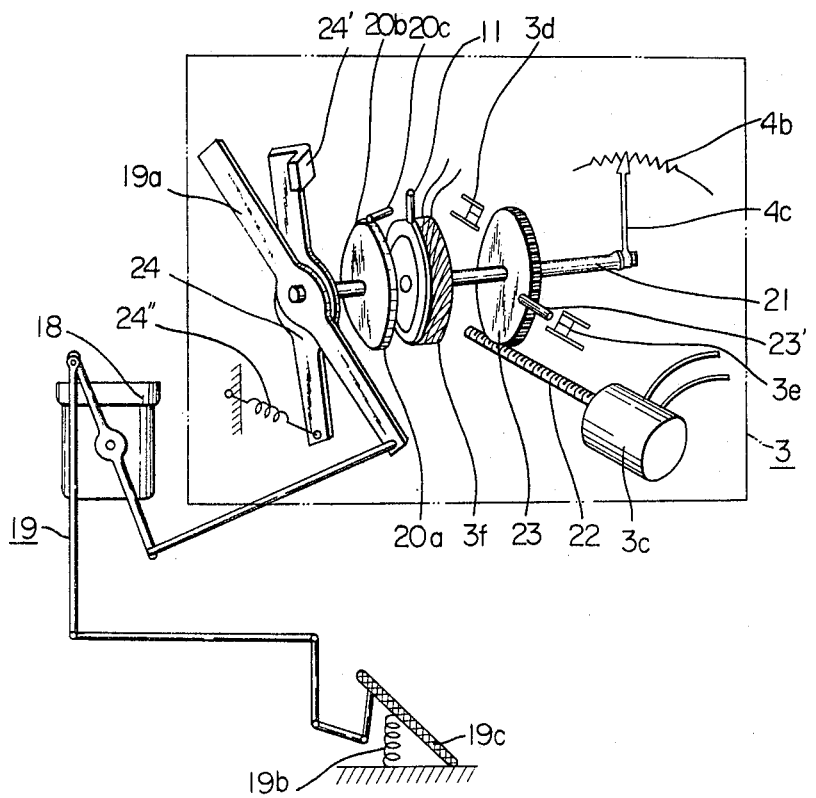
FIG. 3 is a concrete mechanical schematic view of a servo mechanism built in the embodiment.

Referring more particularly to FIGS. 1 to 3, inclusive, there is an automatic constant speed maintaining means for the automobile, embodying this present invention, of which a block diagram is shown in FIG. 1 and an electrical connection diagram is shown in FIG. 2. The automatic constant speed maintaining means is mounted in an automobile and comprises a running speed detecting means 1, a relay circuit 2, a servomechanism 3, a throttle valve 18 (FIG. 3), a potentiometer 4, and a speed setting means 5. In the running speed detecting means 1 is generated a voltage which is in proportion to a running speed of the automobile. The relay circuit 2 comprises several transistors which are operated either positively or negatively depending upon a difference between a voltage generated by the running speed detecting means 1 and another voltage corresponding to a set speed. The servo mechanism 3 is rotated positively or negatively depending upon the status of the relay circuit 2 and acts mechanically on the throttle valve 18 (FIG. 3) so as to control the opening thereof. The potentiometer 4 is a negative feed back arrangement to the relay circuit 2 with a voltage corresponding to the opening of the throttle valve 18, whereby the automatic constant speed maintaining means is kept in the operating state tending to keep the running automobile at the set speed. The speed setting means 5 is provided for setting a desired speed of the automobile.

The embodiment will now be further detailedly explained. The running speed detecting means 1 comprises an alternating generator 1a, a rectifier 1b, and a condenser for smoothing the voltage rectified by the rectifier 1b. The alternating generator 1a is driven by a wheel of the automobile at the same speed therewith in the similar manner with, for example, a speed meter conventional in the automobile.

The relay circuit 2 comprises a throttle valve opening circuit and a throttle valve closing circuit. The throttle valve opening circuit comprises a constant-voltage diode 6, transistors 7 and 8, an amplifying transistor 9, and a normally opened electromagnetic relay 10. The constant-voltage diode 6 is brought into the conductive state when the voltage generated by the running speed detecting means 1, which is proportional to the speed of the automobile becomes a value which is higher than a set value set by the speed setting means 5. The transistors 7 and 8 are brought into the conductive state by the fact that the diode 6 becomes conductive. The amplifying transistors 9 acts reciprocally to the transistors 7 and 8. The throttle valve closing circuit comprises a constant-voltage diode 6', transistors 7' and 8', and a normally opened electromagnetic relay 10'. The constant-voltage diode 6' is brought into the conductive state when impressed with a voltage critical to the constant-voltage diode 6. The transistors 7' and 8' are brought into the conductive state by the fact that the diode 6' becomes conductive. The reference numeral 11 designates a limit switch for positioning the servo mechanism 3. The reference numerals 12 and 13 designate switches operatively connected with the brake pedal and the clutch pedal of the automobile, respectively. The reference numeral 14 designates a battery used as a power source. The reference numerals 15, 15', 16, 16', and 17 designate resistors required for operating the transistors 7, 7', 8, 8', and 9, respectively.

The servo mechanism 3 comprises field windings 3a and 3b for the positive rotation and the negative rotation, respectively, an armature 3c, limit switches 3d and 3e which act at the full admitting position and at the full closing position of the throttle valve 18 so as to co-operate with a protrusion 23' (FIG. 3), respectively, and an electromagnetic clutch winding 3f.

The potentiometer 4 for the feedback comprises a direct current power source 4a, a variable resistor 4b and a brush 4c operatively connected with a lever of the throttle valve 18 (FIG. 3).

The speed setting means 5 whereby a speed is set in the form of a voltage, comprises a direct current power source 5a, a variable resistor 5b, and a manually operative brush 5c for setting a speed.

In operation, at first while the voltage generated by the running speed detecting means 1 is lower than the voltage set by the speed setting means 5, the base current of the transistor 7 does not flow. Therefore, the transistor 7 is in the non-conductive state, so that the base current of the transistor 8 does not flow and the same is in the non-conductive state. Meantime, the base current of the transistor 9 flows across the resistor 17 so that the transistor 9 is in the conductive state. By virtue of the conductivity of the transistor 9, the electromagnetic relay 10 is energized so as to close the same. Therefore, the servo mechanism 3 is energized across the field winding 3a and the armature 3c so as to open the throttle valve 18 mechanically. Therefore, the speed is increased. In accordance with this increase in speed, the voltage generated in the running speed detecting means 1 is increased. At the same time, a voltage corresponding to the increase in opening of the throttle valve is negatively fed back to the input of the relay circuit 2 from the potentiometer 4 so as to give a favorable damping characteristic while tending to bring the speed of the automobile into coincidence with the set value.

In case where the voltage generated by the running speed detecting means 1 is higher than the voltage set by the speed setting means 5 and the one diode 6 is in the conductive state, the transistor 7 is brought into the conductive state so that the transistor 8 is also brought into the conductive state. By virtue of the conductive state of the transistor 8, the emitter of the transistor 9 becomes equipotential with the base thereof so that transistor 9 is brought into the state of discontinuity and, in turn, the electromagnetic relay 10 is deenergized whereby the servo mechanism 3 is deenergized.

In case where the voltage generated by the running speed detecting means 1 is higher than the voltage which is critical to the constant-voltage diodes 6 and 6' or whereby the same are brought into the conductive state, a base current flows across the transistor 7' so as to bring the same into the conductive state which, in turn, brings the transistor 8' into the conductive state. Therefore, the electromagnetic relay 10' is energized so as to close the reversing circuit including the electromagnetic winding 3b and the armature 3c which is then actuated to close mechanically the throttle valve 18. In accordance with the closing motion in the throttle valve 18, the speed of the automobile is decreased so as to lower the voltage generated by the running speed detecting means 1. At the same time, another voltage corresponding to the decrease in opening of the throttle valve is negatively fed back to the input of the relay circuit 2 from the potentiometer 4 so as to give a favorable damping characteristic while tending to bring the speed of the automobile into coincidence with the set value.

When the automobile suddenly encounters a change in state of the road so that either the brake or the clutch pedal is depressed as the case may be, either of the switches 12 and 13 respectively mechanically connected with the brake pedal and the clutch pedal is opened so as to cease the function of this means.

FIG. 3 is a concrete mechanical schematic view of the servo mechanism 3 for operating the throttle valve 18, in which the armature 3c, two limit switches 3d and 3e, and the electromagnetic clutch winding 3f are illustrated. The variable resistor 4b involved in the potentiometer 4 is co-operated with the brush 4c which is mechanically connected with the throttle valve 18 intermediate a link mechanism 19, an electromagnetic clutch 20a and a shaft 21. A worm wheel 23 mounted fixedly on the shaft 21 is engaged with a worm gear 22 driven by the armature 3c, and provided with a protrusion 23' which is adapted to actuate the limit switches 3d and 3e. A controlled arm 24 is operatively connected with the electromagnetic clutch 20a intermediate a shaft 20b and provided with a pawl 24' for engaging with a driving arm 19a. The link mechanism 19 is provided with a compression spring 19b for restoring the link mechanism 19. The electromagnetic clutch 20a is provided with a pin 20c which is adapted to actuate the limit switch 11 for the electromagnetic clutch winding 3f which are shown in also in FIG. 2, when the magnetic clutch 20a is in a predetermined relation with the winding 3f. The reference numeral 19c designates the accelerator pedal.

In operation of the servomechanism 3, when the accelerator pedal 19c is depressed, the intake member containing throttle valve 18 is mechanically opened and the driving arm 19a is turned in the clockwise direction, ending in to engage with the pawl 24' so as to turn the controlled arm 24 in the counterclockwise direction against the action of a tension spring 24''. By virtue of the fixed relation of the controlled arm 24 with the electromagnetic clutch 20a, the latter is also turned in the counterclockwise direction, ending in to engage the pin 20c with the limit switch 11 of the clutch winding 3f so as to energize the same and establish a temporary working connection of the armature 3c with the link mechanism 19 in a predetermined relative position. Under these circumstances, when the armature 3c is rotated accompanying the worm gear 22, the worm wheel 23 is rotated with the shaft 21. By virtue of the electromagnetic clutch 20a, the controlled arm 24 is also rotated so as to drive the link mechanism 19 and vary the opening of the throttle valve 18. At the full admission and at the full closure of the throttle valve 18, the limit switches 3d and 3e are operated by the pin 23' so as to deenergize the armature 3c whereby the same is prevented from overheating due to locking. In addition, the brush 4c is turned together with the worm wheel 23 so that the relay circuit 2 is negatively fed back.

Figure 4:
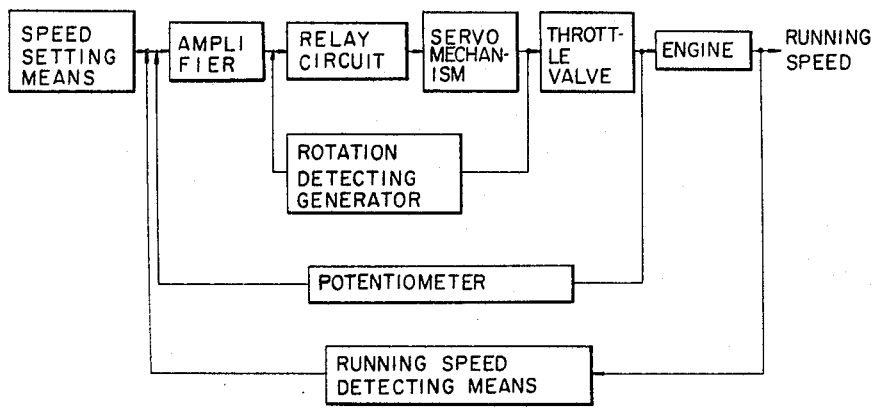
FIG. 4 is a block diagram of a modification of the preceding embodiment.
Figure 5:
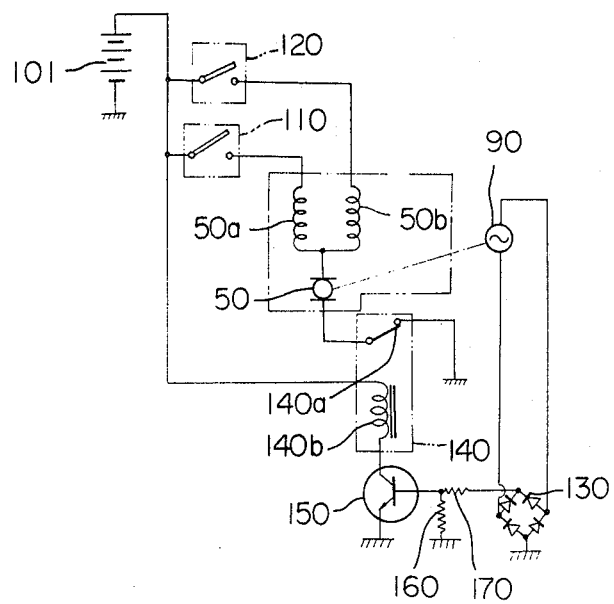
FIG. 5 is an electrical connection diagram of an essential part thereof including a motor and a driving mechanism therefor.

Referring more particularly to FIGS. 4 to 7, inclusive, the second embodiment of this present invention or a preferred modification of the preceding example will now be described. FIG. 4 is a block diagram of this embodiment, showing that an amplifier is added to the arrangement of the preceding embodiment between the speed setting means 5 and the relay circuit 2 and also a rotation detecting generator 90 for detecting the rotation of the servo mechanism 3. As shown in FIG. 5, there are normally opened contacts 110 and 120 driven by signals transmitted from the amplifier, respectively. There is a reversible motor 50 corresponding to the armature 3c of the preceding embodiment, which is provided with an accelerating exciting winding 50a and a decelerating exciting winding 50b, which are energized by a power source 101 and controlled by the normally opened contacts 110 and 120, respectively. The rotation detecting generator 90 is mechanically united with the motor 50 so as to generate an AC voltage proportional to the rotation of the motor 50, which is full-wave rectified by a bridge rectifier 130. The output of the bridge rectifier 130 is impressed to the motor 50 across a resistor 160, a transistor 150, and a relay 140. The transistor 150 is adapted to be brought into the conductive state during the voltage generated by the rotation detecting generator 90 is higher than a predetermined value. The relay 140 is composed of a normally closed contact 140a and an exciting winding 140b and adapted to break the voltage impressed to the motor 50. The voltage to be impressed to the transistor 150 is adjusted by the resistor 160 and one more resistor 170 as shown in FIG. 5.

In operation, while the automobile is running at a speed lower than a set speed, the normally opened contact 11 is closed by a signal which is the output of the speed setting means 5 and amplified by the amplifier, so as to energize the accelerating exciting winding 50a of the motor 50 whereby the throttle valve 18 is mechanically opened. When the running speed has become higher than the set speed, the normally opened contact 110 is restored and the normally opened contact 120 is closed by another signal similarly transmitted from the speed setting means 5 across the amplifier, so as to deenergize the accelerating exciting winding 50a and energize the decelerating exciting winding 50b of the motor 50 whereby the throttle valve 18 is mechanically closed so as to decelerate the automobile. This is quite similar to the preceding example. However, merely by virtue of the above behaviour of the motor 50 repeated by the action of relays involving the normally opened contacts 110 and 120, it is impossible to obtain preferable damping characteristics of the throttle valve, but the driving speed of the motor 50 perpetually varies in accordance with variation in load, which is considered the perpetual variation in gain from the standpoint of the control.

Figure 6A:
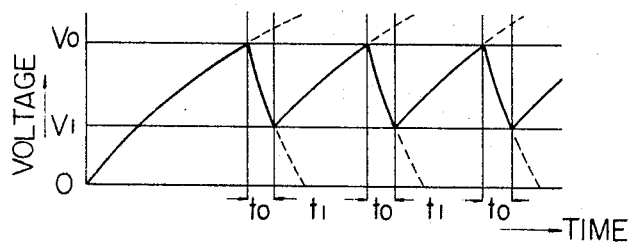
FIGS. 6(a) and 6(b) are graphs showing wave forms of voltages generated by a rotation detecting generator connected with the motor.

To overcome this drawback, in this embodiment in accordance with this present invention there is additionally provided the rotation detecting generator 90 together with the relay 140 adapted to be driven by the voltage generated by the former and arranged to be interposed in the power circuit for the motor 50. The relay 140 will now be more detailedly explained. The motor 50 is energized from the power source 101 across either of the two normally opened contacts 110 and 120 of the relay 140 while either one is on. When the rotation of the motor 50 is increased, the voltage generated by the rotation detecting generator 90 is also increased in proportion thereto. In FIGS. 6(a) and (b), the time is represented by the ordinates and the voltage is represented by the ordinates and the voltage is represented by the abscissae, respectively. In FIG. 6(a), a period where the motor 50 is heavily loaded so that the opening of the throttle valve 18 is increased, is shown. During this period, the rotation of the motor 50 is slowly increased so that the voltage is also slowly increased until a predetermined value $V_0$ is attained. The transistor 150 is adapted to be brought into the conductive state when the base current becomes $V_0$ so that, when the voltage becomes $V_0$, the exciting winding 140b of the relay 140 is energized whereby the normally closed contact 140a is broken and the motor 50 is deenergized, resulting in that the rotation of the motor 50 is suddenly decreased so that the voltage generated by the rotation detecting generator 90 is also suddenly decreased. At the same time, the normally closed contact 140a of the relay 140 is not closed also suddenly but left as it is opened until the voltage becomes $V_1$ by virtue of the hysteresis of the relay 140. That is, after a constant time $t_0$ has elapsed and the voltage has become $V_1$, the normally closed contact 140a is closed. By virtue of the closure of the normally closed contact 140a there is again energized the power circuit for the motor 50 so that the voltage generated by the rotation detecting generator 90 is again increased and so on. Thus the operation is repeated as illustrated in FIG. 6(a). FIG. 7(a) shows a variation in voltage impressed to the motor 50 correspondingly to the variation shown in FIG. 6(a) for the same period. In FIGS. 7(a) and 7(b), the time is represented by the ordinates and the voltage is represented by the abscissae similarly to the FIG. 6. While the voltage generated by the rotation detecting generator 90 varies along a saw blade-shaped curve as shown in FIG. 6(a), the voltage correspondingly impressed on the motor 50 varies along rectangles as shown in FIG. 7(a) so that the period $t_1$ during which the voltage is impressed on the motor 50 is longer than the period $t_0$ during which the power source circuit for the motor 50 is off.

Figure 6B:
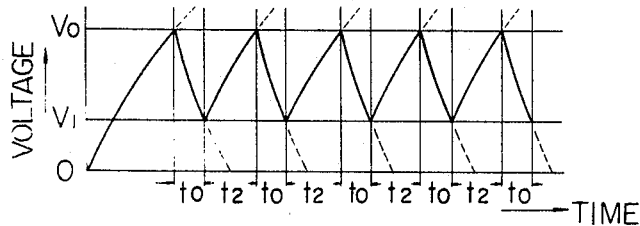
Figure 7A:
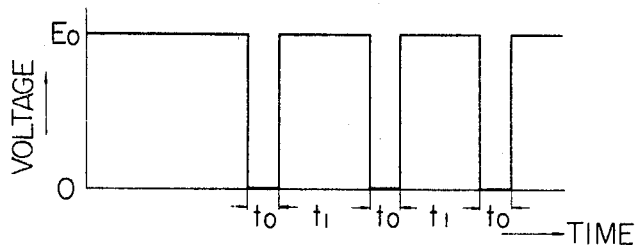
FIGS. 7(a) and 7(b) are graphs showing wave forms of voltages impressed to the motor.
Figure 7B:
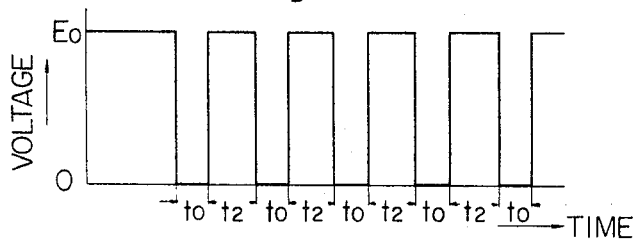

In FIGS. 6(b) and 7(b), such a period that the motor 50 is less loaded so that the throttle valve 18 is closed, is illustrated. During this period, because the rotation of the motor 50 is sharply increased, the voltage generated by the rotation detecting generator 90 arrives quickly at the value $V_0$ so as to make the transistor 150 in the conductive state within a shorter period. By virtue of the conductive state of the transistor 150, the exciting winding 140b of the relay 140 is energized so as to open the normally closed contact 140a and, in turn, to break the power circuit for the motor 50, ending in that the rotation thereof is decreased suddenly. As described hereinbefore, by virtue of the hysteresis of the relay 140, the normally closed contact 140a thereof is not restored as soon as the sudden voltage drop in the output of the rotation detecting generator 90 occurs, but, after a constant time $t_0$ has elapsed, the normally closed contact 140a is closed when the voltage generated by the rotation detecting generator 90 has come up to the value $V_0$. This variation is repeated as shown in FIG. 6(b). The variation in voltage impressed to the motor 50 correspondingly to the above-explained variation is illustrated in FIG. 7(b), which is a rectangular wave while the above-explained variation is a saw blade-shaped wave.

Comparing the wave illustrated in FIG. 7(a) with the wave illustrated in FIG. 7(b), it is to be understood that the time $t_2$ during which the motor 50 is impressed with the voltage $V_0$ as shown in FIG. 7(b) is appreciably shorter than the corresponding time $t_1$ as shown in FIG.

7(a). The former represents a heavier load while the latter represents a lighter load. The frequency of the rectangular waves is more when the load is lighter. Since the time $t_0$ is constant, the average voltage impressed on the motor 50 is more when the load is heavier and vice versa. By virtue of this directly proportional relation, the rotation or the output of the motor 50 becomes substantially constant regardless of heaviness of the load, so that the ratio of the input of the motor 50 or the average voltage impressed thereto to the output of the motor 50 or the rotation, which is the gain of the motor controlling system, becomes constant whereby the closure of the throttle valve is done at the same speed with the opening thereof.

What is claimed as new and desired to be secured by Letters Patent of the United States is:

1. An automatic constant speed maintaining means for an automobile, comprising a running speed detecting means, a speed setting means, a relay circuit, a servo mechanism, and a potentiometer, said running speed detecting means generating a voltage proportional to the speed of said automobile, said speed setting means being adapted to set the speed of said automobile at a desired predetermined value, said relay circuit comprising means including transistors being actuated by a difference between said speed proportional voltage and another voltage corresponding to said desired predetermined value, the direction in which said servo mechanism is rotated, depending upon the first-named direction in which said relay acts, the opening of a throttle valve of said automobile being adapted to be mechanically controlled by said servo mechanism and depending upon the last-named direction of the rotation of said servo mechanism, potentiometer voltage being negatively fed back from said potentiometer to the input side of said relay circuit, and said potentiometer voltage corresponding to said opening, whereby the automatic constant speed maintaining means is kept in operation by the action of itself, tending to keep the running speed of said automobile at said predetermined value.

2. An automatic constant speed maintaining means for an automobile, as claimed in claim 1, in which a rotation detecting generator which detects the rotation of a motor of said servo mechanism and generates a voltage, is further provided, a transistor being operated by the last-named voltage and a relay inserted in a power circuit of said motor being regulated by said transistor, whereby the opening of said throttle valve is made at the same speed with the closure thereof.

References Cited

UNITED STATES PATENTS

| | | | |
|---|---|---|---|
| 2,971,596 | 2/1961 | Davis et al. | 180—109 |
| 3,070,185 | 12/1962 | Fales | 180—108 |
| 3,116,807 | 1/1964 | Wilson | 317—5 X |
| 3,172,497 | 3/1965 | Stoner et al. | 123—102 X |
| 3,344,880 | 10/1967 | Iwashita et al. | 180—109 |
| 3,381,771 | 5/1968 | Granger et al. | 180—108 |

KENNETH H. BETTS, Primary Examiner

U.S. Cl. X.R.

123—102